(12) United States Patent
Takeda et al.

(10) Patent No.: US 7,521,129 B2
(45) Date of Patent: Apr. 21, 2009

(54) STEEL SHEET FOR DISSIMILAR MATERIALS WELDBONDING TO ALUMINUM MATERIAL AND DISSIMILAR MATERIALS BONDED BODY

(75) Inventors: Mikako Takeda, Kobe (JP); Wataru Urushihara, Kobe (JP); Katsushi Matsumoto, Kobe (JP); Jun Katoh, Kobe (JP)

(73) Assignee: Kabushiki Kaisha Kobe Seiko Sho (Kobe Steel, Ltd.), Kobe-shi (JP)

( * ) Notice: Subject to any disclaimer, the term of this patent is extended or adjusted under 35 U.S.C. 154(b) by 331 days.

(21) Appl. No.: 11/436,703

(22) Filed: May 19, 2006

(65) Prior Publication Data

US 2006/0275623 A1     Dec. 7, 2006

(30) Foreign Application Priority Data

Jun. 1, 2005    (JP)   ............................ 2005-161723

(51) Int. Cl.
*B32B 15/04*    (2006.01)
(52) U.S. Cl. ..................... 428/653; 428/612; 428/472.2
(58) Field of Classification Search ................. 428/632, 428/633, 639, 650, 653, 651, 684, 685; 148/334
See application file for complete search history.

(56) References Cited

U.S. PATENT DOCUMENTS

| | | |
|---|---|---|
| 2003/0054195 A1 | 3/2003 | Ishii et al. |
| 2006/0275623 A1 | 12/2006 | Takeda et al. |
| 2007/0212565 A1* | 9/2007 | Urushihara et al. ......... 428/577 |

FOREIGN PATENT DOCUMENTS

| | | |
|---|---|---|
| JP | 4-55066 | 2/1992 |
| JP | 4-127973 | 4/1992 |

(Continued)

OTHER PUBLICATIONS

U.S. Appl. No. 11/578,406, filed Oct. 13, 2006, Urushihara et al.
U.S. Appl. No. 12/280,599, filed Aug. 25, 2008, Urushihara et al.

*Primary Examiner*—John J Zimmerman
(74) *Attorney, Agent, or Firm*—Oblon, Spivak, McClelland, Maier & Neustadt, P.C.

(57) ABSTRACT

Disclosed is a steel sheet for dissimilar materials weldbonding to an aluminum material, the steel sheet containing, in mass, C: 0.02 to 0.3%, Si: 0.2 to 5.0%, Mn: 0.2 to 2.0%, and Al: 0.002 to 0.1%, further one or more of Ti: 0.005 to 0.10%, Nb: 0.005 to 0.10%, Cr: 0.05 to 1.0%, and Mo: 0.01 to 1.0%, and the balance consisting of Fe and unavoidable impurities. In the steel sheet, (i) the proportion of the oxide containing Mn and Si by 1 at. % or more in total in the external oxide layer which is newly formed after an original oxide layer having already existed on the surface of the steel sheet is once removed and now exists on the surface of the base steel material of the steel sheet is 50 to 80% in terms of the average proportion of the total length of the oxide to 1 μm length of the interface between the base steel material and the external oxide layer nearly in the horizontal direction, (ii) the proportion of the internal oxide, including oxide at the grain boundary, which exists in the steel region up to the depth of 10 μm from the surface of said base steel material of said steel sheet and contains Mn and Si by 1 at. % or more in total is 3% or more to less than 10% in terms of the average area percentage of said internal oxide in the visual field of 10 μm$^2$ of said steel region, (iii) the proportion of the internal oxide, including oxide at the grain boundary, which exists in the steel region exceeding 10 μm in depth from the surface of said base steel material of said steel sheet and contains Mn and Si by 1 at. % or more in total is 0.1% or less in terms of the average area percentage of said internal oxide in the visual field of 10 μm$^2$ of said steel region.

20 Claims, 1 Drawing Sheet

FOREIGN PATENT DOCUMENTS

| | | |
|---|---|---|
| JP | 4-143083 | 5/1992 |
| JP | 4-251676 | 9/1992 |
| JP | 4-253578 | 9/1992 |
| JP | 5-111776 | 5/1993 |
| JP | 5-111778 | 5/1993 |
| JP | 5-228643 | 9/1993 |
| JP | 6-63763 | 3/1994 |
| JP | 7-24581 | 1/1995 |
| JP | 7-178563 | 7/1995 |
| JP | 9-174249 | 7/1997 |
| JP | 2000-1749 | 1/2000 |
| JP | 2002-294487 * | 10/2002 |
| JP | 2004-017148 * | 1/2004 |
| JP | 2004-17148 | 1/2004 |
| JP | 2005-334971 | 12/2005 |
| WO | WO 2005/102586 A1 | 11/2005 |

* cited by examiner

F I G. 1A   F I G. 1B

F I G. 2

F I G. 3

STEEL SHEET FOR DISSIMILAR MATERIALS WELDBONDING TO ALUMINUM MATERIAL AND DISSIMILAR MATERIALS BONDED BODY

BACKGROUND OF THE INVENTION

1. Field of the Invention

The present invention relates to a steel sheet for dissimilar materials weldbonding to an aluminum material and a dissimilar materials bonded body formed by weldbonding the steel sheet to the aluminum material, which can have a high bonding strength.

2. Description of the Related Art

In recent years, it has been attempted to apply a light alloy such as an aluminum system material (a generic name of pure aluminum and aluminum alloys, hereunder referred to simply as an aluminum material) to a structure such as an automobile from the viewpoint of environmental issues.

From the viewpoints of weldability, corrosion resistance, and formability however, aluminum materials are used only for some of automobile members. In this light, steel sheets for automobiles which have heretofore been used and aluminum materials are in a coexistent state and the application of Fe—Al dissimilar materials bonding to a member formed by combining a steel sheet with an aluminum material has increasingly been demanded.

A problem in Fe—Al dissimilar materials bonding is that an intermetallic compound layer of Fe and Al which is hard and very brittle is formed at a bonded interface. Consequently, there are many cases where a sufficient bonding strength is not secured due to the formation of such a compound layer even when the materials are apparently bonded.

In consideration of the above situation, bonding with bolts, rivets, or those combined with adhesives has heretofore been adopted for the bonding of a dissimilar materials bonded body (a dissimilar metals member). However, such a bonded joint has the problems of reliability, airtightness, costs and others.

In this light, methods of spot-welding such a dissimilar materials bonded body have heretofore been variously studied. For example, methods of inserting an aluminum-steel clad material between an aluminum material and a steel material are proposed (refer to Patent Documents 1 to 6). Further, methods of plating the side of a steel material with a metal having a low melting point or inserting a metal having a low melting point are proposed (refer to Patent Documents 7 to 9). Furthermore, a method of interposing insulator particles between an aluminum material and a steel material (refer to Patent Document 10) and a method of forming jogs on a member beforehand (refer to Patent Document 11) are proposed.

In addition, also proposed is a method of removing a non-uniform oxide film on an aluminum material, thereafter heating the aluminum material for 8 hours at 200° C. to 450° C. in the air and thus forming a uniform oxide film, and, in the state wherein the contact resistance of the aluminum surface is increased, applying spot welding while an aluminum-steel double-layer steel sheet is used as the insertion material (refer to Patent Document 12).

In the meantime, it is publicly known that, when elements such as Si, Mn, Al and others which tend to form oxide are added in order to increase the strength of a steel sheet, oxide containing such Si, Mn, Al and others forms on the surface of the base material. Then, it is also publicly known that the oxide containing such Si, Mn, Al and others hinders the adhesiveness between a surface coating such as a zinc coating and a steel sheet. On the contrary, it is also publicly known that, by subjecting the steel sheet to pickling or the like and thereby controlling the thickness of an oxide layer containing such Si, Mn, Al and others in the range from 0.05 to 1 μm, the adhesiveness between the surface coating such as a zinc coating and the steel sheet and spot-weldability between steel sheets improve (refer to Patent Document 13).

[Patent Document 1] JP-A No. 55066/1992 (full text)
[Patent Document 2] JP-A No. 127973/1992 (full text)
[Patent Document 3] JP-A No. 253578/1992 (full text)
[Patent Document 4] JP-A No. 111778/1993 (full text)
[Patent Document 5] JP-A No. 63763/1994 (full text)
[Patent Document 6] JP-A No. 178563/1995 (full text)
[Patent Document 7] JP-A No. 251676/1992 (full text)
[Patent Document 8] JP-A No. 24581/1995 (full text)
[Patent Document 9] JP-A No. 14383/1992 (full text)
[Patent Document 10] JP-A No. 228643/1993 (full text)
[Patent Document 11] JP-A No. 174249/1997 (full text)
[Patent Document 12] JP-A No. 63763/1994 (full text)
[Patent Document 13] JP-A No. 294487/2002 (full text)

SUMMARY OF THE INVENTION

In a method of applying seam welding or resistance welding while a clad material of a double-layer structure comprising a steel and an aluminum is used, since a clad material is inserted between an aluminum sheet and a steel sheet, three sheets must be used for the bonding of tabular members which normally require two sheets. Consequently, in the event of actual production, not only the processes of the insertion, fixture, and bonding of a clad material are required and thus the operations become complicated but also the reliability in the quality of a bonded joint is insufficient. Further, since a clad material used for the bonding is produced by bonding an aluminum material to a steel material, the restrictions on production conditions are plenty and a higher degree of technology is required for the production of a clad material itself having a low cost and stable performance. Furthermore, as another drawback of the technology, there is the problem in that new equipment must be incorporated into an existing bonding line and thus the welding cost also increases. Moreover, there also are operational difficulties including the fact that welding conditions are extremely restricted.

In the meantime, as stated above, it has been publicly known that, in the case of a high-strength steel sheet containing Si, Mn, Al and others, the oxide being formed on the surface of the base material and containing Si, Mn, Al and others hinders the adhesiveness between a surface coating such as a zinc coating and the steel sheet. Further, it has also been publicly known that, if the thickness of an oxide layer containing Si, Mn, Al and others is controlled in the aforementioned appropriate range, on the contrary the adhesiveness between the surface coating such as the zinc coating and the steel sheet and the spot-weldability between the steel sheets improve.

Nevertheless, in the case of a high-strength steel sheet containing Si, Mn, Al and others, the influence of the oxide, which is formed on the surface of a base material and contains Si, Mn, Al and others, on the bonding strength of a dissimilar materials bonded body when the high-strength steel sheet is weldbonded to an aluminum material has not always been obvious.

The present invention has been established in view of the above problems and the object thereof is to provide: a high-strength steel sheet containing Si, Mn and others, which has less restrictions in application conditions and the like when it is bonded to an aluminum material, thus is excellent in versatility, prevents brittle intermetallic compounds and the like from forming at the bonded part and thus hindering the reliability of the bonding, and can obtain a bonded part having a high bonding strength; and a dissimilar materials bonded body made of the steel sheet and the aluminum material.

The gist of a steel sheet for dissimilar materials weldbonding to an aluminum material according to an aspect of the present invention to attain the above object is a steel sheet containing, in mass, C: 0.02 to 0.3%, Si: 0.2 to 5.0%, Mn: 0.2 to 2.0%, and Al: 0.002 to 0.1%, further one or more of Ti: 0.005 to 0.10%, Nb: 0.005 to 0.10%, Cr: 0.05 to 1.0%, and Mo: 0.01 to 1.0%, and the balance consisting of Fe and unavoidable impurities, wherein the proportion of the oxide containing Mn and Si by 1 at. % or more in total in the external oxide layer which is newly formed after an original oxide layer having already existed on the surface of the steel sheet is once removed and now exists on the surface of the base steel material of the steel sheet is 50 to 80% in terms of the average proportion of the total length of the oxide to 1 µm length of the interface between the base steel material and the external oxide layer nearly in the horizontal direction.

Here, the balance excluding the oxide containing Mn and Si by 1 at. % or more in total in the external oxide layer means oxide containing Mn and Si by less than 1 at. % in total and voids, and thus the external oxide layer cited in the present invention is composed of the oxide containing Mn and Si by 1 at. % or more in total, the oxide containing Mn and Si by less than 1 at. % in total, and the voids.

Further, the gist of a dissimilar materials bonded body made of a steel material and an aluminum material according to the aspect of the present invention to attain the above object is a dissimilar materials bonded body formed by weldbonding either a steel sheet of the above gist or a steel sheet including the following preferred embodiment to an aluminum material, wherein the average thickness, in the direction of the nugget depth, of the reaction layer at the bonded interface between the steel sheet and the aluminum material is 0.1 to 10 µm and the range wherein the reaction layer is formed is 50% or more in terms of the bonding length in the case of linear welding or in terms of the bonding area in the case of spot welding.

The present invention is in the same direction as Patent Document 13 in terms of forming oxide containing Si, Mn, Al and others in an appropriate range on the surface of a high-strength steel sheet containing Si, Mn, Al and others.

However, the present invention involves an external oxide layer which is newly formed by once removing an original oxide layer having already existed on the surface of a steel sheet by pickling or the like and further applying annealing in an atmosphere wherein the oxygen partial pressure is controlled or another means and now exists on the surface of the base steel material of the steel sheet.

In Patent Document 13 too, the adhesiveness with a zinc coating is improved by controlling the thickness of an oxide layer containing Mn, Si, and Al (Mn, Si, and Al are concentrated) on the surface of a steel sheet to 0.05 to 1 µm (preserving the oxide layer) by pickling or the like. However, in Patent Document 13, although an oxide layer on the surface of a steel sheet is once removed by pickling or the like in the same way as the present invention, the means, adopted in the present invention, of actively controlling the proportion in a formed external oxide layer and the depth of an internal oxide layer by further applying annealing in an atmosphere wherein the oxygen partial pressure is controlled is not carried out.

For that reason, in the case of an external oxide layer according to Patent Document 13, the proportion of the oxide containing Mn and Si by 1 at. % or more in total stipulated in the present invention exceeds the upper limit 80% with ease in terms of the average proportion of the total length of the oxide to 1 µm length of the interface between the base steel material and the external oxide layer nearly in the horizontal direction.

As a result, when a steel sheet having an oxide layer containing Si, Mn, Al and others of a thickness stipulated in Patent Document 13 is weldbonded to an aluminum material, a reaction layer (an intermetallic compound layer of Fe and Al, either of the above terms is occasionally used in the explanations below) is formed insufficiently and the metallurgic bonding in a dissimilar materials bonded body cannot be secured.

The present inventors have found that an external oxide layer containing Si, Mn and others which is newly formed after an original oxide layer having already been formed on the surface of a high-strength steel sheet containing Si, Mn and others is once removed rather improves the bonding strength of a dissimilar materials bonded body formed by weldbonding the steel sheet to an aluminum material.

That is, in the case of weldbonding dissimilar materials of a steel sheet and an aluminum material, such an external oxide layer which is newly formed and contains Si, Mn and others, when it exists at a prescribed proportion, suppresses the diffusion of Fe and Al during the bonding and inhibits an Al—Fe system brittle intermetallic compound layer from forming excessively.

Further, the present inventors have also found that the proportion of such an external oxide layer which is newly formed and contains Si, Mn and others on the surface of a steel sheet largely influences the bonding strength of a dissimilar materials bonded body and the thickness and distribution of a reaction layer. That is, such an external oxide layer which is newly formed and contains Si, Mn and others can exhibit the effect of inhibiting the reaction layer from forming excessively only when the proportion is stipulated in accordance with the aforementioned gist of the present invention.

A proportion of such an external oxide layer which is newly formed and contains Si, Mn and others can be controlled by controlling the annealing condition (oxygen partial pressure) of a steel sheet after pickling.

Unlike spot welding between steel sheets, in the case of weldbonding dissimilar materials of a steel sheet and an aluminum material, a hard and very brittle intermetallic compound layer of Fe and Al is formed at a bonded interface as stated above. Consequently, the welding mechanism in this case is entirely different from that in the case of spot welding between steel sheets which is the subject of the aforementioned Patent Document 13 and the weldbonding between dissimilar materials is outstandingly difficult.

More specifically, in the case of bonding dissimilar materials of a steel material and an aluminum material, since the steel material has a higher melting point, a higher electrical resistance and a lower thermal conductivity than the aluminum material, heat generation on the side of the steel increases and the aluminum of a lower melting point melts in advance. Successively, the surface of the steel material melts and resultantly an Al—Fe system brittle intermetallic compound layer (reaction layer) is formed at the interface.

Therefore, in order to obtain a high bonding strength, it is necessary to suppress the amount of an Al—Fe system reaction layer to the necessity minimum. On the other hand however, when an Al—Fe system reaction layer is excessively suppressed and the proportion of the area of a formed reaction layer to the total area of the bonded part is too small, metallurgical bonding is not secured and thus a high bonding strength cannot be obtained. Therefore, in order to realize a high bonding strength, it is necessary to form an Al—Fe reaction layer having a minimum thickness necessity for metallurgical bonding in as large an area as possible of the bonded part.

As stated above, in the case of weldbonding dissimilar materials of a steel sheet and an aluminum material, the welding mechanism is entirely different from the case of spot welding between steel sheets and it is extremely difficult to realize a high bonding strength between the dissimilar materials.

In contrast, an external oxide layer which is newly formed and contains Si, Mn and others according to the aspect of the present invention, when it exists at a prescribed proportion as mentioned in the aforementioned gist, exhibits the effects of inhibiting the aforementioned reaction layer from excessively forming and forming an Al—Fe reaction layer having a minimum thickness necessity for metallurgical bonding in a large area of the bonded part. As a result, a dissimilar materials bonded body of a steel sheet and an aluminum material can have a high bonding strength.

By using a steel sheet according to the aspect of the present invention, it is possible to form a reaction layer having an appropriate thickness in a wider range and obtain a dissimilar materials bonded body having a high bonding strength and reliability even through a welding process which heretofore has caused a reaction layer to form excessively at an Fe/Al bonded interface and has yielded an insufficient bonding strength. As a result, the present invention makes it possible to provide a dissimilar materials bonded body of a steel sheet and an aluminum material having a high bonding strength without interposing another material such as a clad material, requiring an additional process, and moreover largely changing the conditions on the sides of the steel sheet, the aluminum material and spot welding. Such a bonded body can be applied very usefully to the field of transportation such as automobiles and railroad cars and as various kinds of structural members of machine parts, building structures and others.

BRIEF DESCRIPTION OF THE DRAWINGS

Embodiments of the present invention will be described in detail based on the following figures, wherein.

DETAILED DESCRIPTION OF THE INVENTION (Chemical Component Composition of Steel Sheet)

Firstly, the component composition of a steel sheet involved in the present invention is hereunder explained. Here, the unit of all chemical components is percentage by mass.

The present invention involves a high-strength steel sheet containing Si, Mn and others. Further, the present invention involves a steel sheet which can newly form an external oxide layer containing prescribed amounts of Si, Mn and others when the steel sheet is further annealed in an atmosphere wherein the oxygen partial pressure is controlled or the like after an original oxide layer having already existed on the surface is once removed by pickling or the like.

To this end, a steel sheet is, on the premise that the steel sheet contains prescribed amounts of Si, Mn and others, stipulated so as to have a component composition comprising C: 0.02 to 0.3%, Si: 0.2 to 5.0%, Mn: 0.2 to 2.0%, and Al: 0.002 to 0.1%, further one or more of Ti: 0.005 to 0.10%, Nb: 0.005 to 0.10%, Cr: 0.05 to 1.0%, and Mo: 0.01 to 1.0%, and the balance consisting of Fe and unavoidable impurities.

The reasons for limiting each of the component elements in a steel sheet are as follows.

(C)

C is an element necessary to increase strength and, when a C content is less than 0.02%, the strength of a steel sheet is not secured. However, when a C content exceeds 0.3%, cold-workability deteriorates. Therefore, a C content is limited in the range from 0.02 to 0.3%.

(Mn and Si)

Mn and Si form an external oxide layer containing a prescribed amount of Si or Mn on the surface of a steel sheet. Such an external oxide layer can hinder Fe and Al from diffusing and inhibit brittle intermetallic compounds from forming to the minimum in the case of dissimilar material bonding between Fe and Al. Further, they may be helpful in improving the brittleness of intermetallic compounds.

Furthermore, Mn and Si form an internal oxide layer containing a prescribed amount of Si or Mn in the interior of a steel sheet. Such an internal oxide layer dissolves into an Al—Fe reaction layer formed by breaking an external oxide layer on the surface of a steel sheet, thus prevents Fe and Al from diffusing, and inhibits the reaction layer from forming excessively.

Therefore, when the contents of Mn and Si in a steel sheet are too small, the external and internal oxide layers are insufficient and the bonding strength of a dissimilar materials bonded body cannot be improved as it will be described later. On the other hand, when the contents of Mn and Si in a steel sheet are excessive, the bonding strength of a dissimilar materials bonded body rather deteriorates as it will be described later: For those reasons, in order to form appropriate external and internal oxide layers as described above, the contents of Mn and Si in a steel sheet must be in the aforementioned ranges stipulated in the present invention.

(Si)

Si is important also as an element which can secure a necessary strength without deteriorating the ductility of a steel sheet and, in order to do so, a Si content of 0.2% or more is necessary. On the other hand, when Si is contained in excess of 5.0%, the ductility deteriorates. Therefore, a Si content is limited in the range from 0.2 to 5.0% for the reason too.

(Mn)

Mn is also essential as an element to secure the strength and toughness of a steel sheet but, when a Mn content is less than 0.2%, the effects cannot be obtained. On the other hand, when a Mn content exceeds 2.0%, the strength extremely increases and cold-working is hardly applied. Therefore, a Mn content is limited in the range from 0.2 to 2.0% for the reason too.

(Al)

Al, as a deoxidizing element in molten steel, traps dissolved oxygen, prevents blowholes from forming, and is an element effective also in improving the toughness of a steel sheet. When an Al content is less than 0.002%, those effects are obtained insufficiently. On the other hand, when an Al content exceeds 0.10%, inversely weldability is deteriorated and the toughness of a steel is deteriorated due to the increase of alumina system inclusions. Therefore, an Al content is limited in the range from 0.002 to 0.10%.

(Ti, Nb, Cr and Mo)

Besides the above basic elements, when one or more of Ti, Nb, Cr and Mo is/are contained, they contribute to the increase of the strength and toughness of a steel.

(Ti and Nb)

Ti and Nb precipitate as carbonitride in a steel, thus increase strength, fine the microstructure of the steel, and improve strength, toughness and others. However, when they are contained abundantly, toughness largely deteriorates. Therefore, the contents of Nb and Ti are limited in the range from 0.005 to 0.10%, respectively.

(Cr and Mo)

Cr and Mo improve the hardenability of a steel and improve strength. However, when they are contained abundantly, the toughness of a steel is largely deteriorated. Therefore, a Cr content is limited in the range from 0.05 to 1.0% and a Mo content is limited in the range from 0.01 to 1.0%.

(Strength of Steel Sheet)

The present invention does not particularly limit the strength of a steel sheet used but, in consideration of application to automobile members, a preferable tensile strength of a steel sheet is 400 MPa or more. In the case of a steel having a strength lower than that, since the steel is generally a low alloy steel and the oxide film thereof is mostly composed of iron oxide, Fe and Al diffuse easily and brittle intermetallic compounds are likely to form. Further, since the amount of Si or Mn is small, the oxide containing Si and Mn stipulated in the present invention is hardly formed on the surface and in the interior of the steel sheet, the oxide containing Si and Mn cannot be controlled, and a reaction layer is hardly controlled. Furthermore, in the case of spot welding for example, a steel sheet deforms largely by the pressure of electrode tips, the oxide film is easily destroyed, and hence the reaction with aluminum is accelerated. As a result, intermetallic compounds are likely to form.

(Aluminum Material)

An aluminum material used in the present invention is not particularly limited with regard to the kind of alloy and the shape and is arbitrarily selected from among a tabular material, a shape material, a forged material, a cast material, and others, which are generally used in accordance with properties required as a structural member.

With regard to the strength of an aluminum material however, a higher strength is desirable in order to avoid deformation caused by the pressure applied at the time of spot welding in the same manner as the aforementioned steel material. In this regard, among aluminum alloys, an aluminum material of A5000 system, A6000 system or the like which has a high strength and is generally used as a structural member of this type is most appropriately used.

(Thickness of Steel Sheet and Aluminum Material)

The thickness of a steel sheet and an aluminum material is not particularly limited and is arbitrarily selected and decided in consideration of design conditions including strength and toughness required for an applied member such as an automobile member.

If application to an automobile member or the like is assumed however, a practically selected thickness $t_1$ of a steel sheet is in the range from 0.3 to 2.5 mm. When the thickness $t_1$ of a steel material is less than 0.3 mm, strength and toughness necessary for an automobile member are not secured and the thickness is improper. In addition to that, in the case of applying spot welding for example, a steel sheet deforms largely by the pressure of electrode tips, an oxide film is easily destroyed, and thereby reaction with aluminum is accelerated. As a result, intermetallic compounds are likely to form. On the other hand, when the thickness $t_1$ exceeds 2.5 mm, weldbonding itself is hardly carried out and another bonding means is adopted.

Further, if application to an automobile member or the like is assumed likewise, a selected thickness $t_2$ of an aluminum material is in the range from 0.5 to 2.5 mm. When the thickness $t_2$ of an aluminum material is less than 0.5 mm, not only strength is insufficient and improper as an automobile member but also a nugget diameter is not secured, melting tends to reach the surface of the aluminum material, expulsion tends to be caused, and hence a high bonding strength may not be obtained. On the other hand, when the thickness $t_2$ of an aluminum material exceeds 2.5 mm, weldbonding itself is hardly carried out and another bonding means is adopted in the same manner as the aforementioned case of the thickness of a steel material.

(Oxide Structure of Steel Sheet)

On the basis of the aforementioned prerequisite conditions, the oxide structure (stipulated conditions) of a steel sheet intrinsic to the present invention is hereunder explained.

Figure 1A:
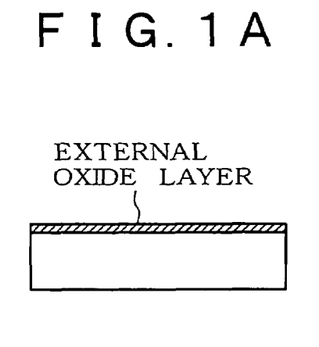
FIGS. 1A and 1B are schematic views showing a steel sheet for a dissimilar materials bonded body according to an embodiment of the present invention.
Figure 1B:
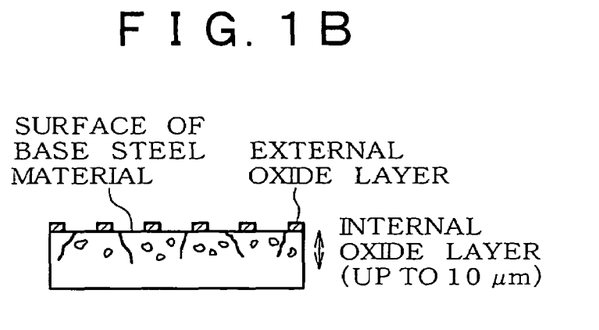

FIGS. 1A and 1B represent schematic views showing the oxide structures of steel sheets which are once pickled and thereafter annealed in atmospheres wherein the oxygen partial pressures are controlled and contain Si and Mn. FIG. 1A represents the case of annealing a steel sheet in an atmosphere of a low oxygen partial pressure (low dew point) and FIG. 1B represents the case of annealing a steel sheet in an atmosphere of a high oxygen partial pressure (high dew point), respectively.

In the case of annealing a steel sheet in an atmosphere of a low oxygen partial pressure as shown in FIG. 1A, the steel sheet containing Si and Mn from which an already existed external oxide layer is once removed by pickling has a thin external oxide layer of about 50 nm on the surface of the base steel material of the steel sheet and internal oxide containing grain boundary oxide is not formed in the interior of the steel sheet below the surface of the base steel material. The external oxide layer is an oxide layer which is newly formed by the annealing after an already existed oxide layer is removed and comprises: oxide which comprises $Mn_2SiO_4$, $SiO_2$ or others and contains Si and Mn by 1 at. % or more by the concentration of Si and Mn; or iron oxide ($Fe_3O_4$).

In contrast, in the case of annealing a steel sheet in an atmosphere of a high oxygen partial pressure as shown in FIG. 1B, the steel sheet containing Si and Mn from which an already existed external oxide layer is once removed by pickling has an external oxide layer as stated above and moreover internal oxide is formed in the interior of the steel sheet below the surface of the base steel material. The internal oxide is spherical or granular oxide comprising $SiO_2$ and $Mn_2SiO_4$ and containing Si and Mn by about 1 at. % or more. Further, in this case, grain boundary oxide is also formed at the grain boundary of the steel and this oxide is also granular oxide containing Si and Mn by about 1 at. % or more.

An external oxide layer on the surface of a steel sheet generally comprises oxide such as $\alpha FeOOH$, $\gamma FeOOH$, amorphous oxy-hydroxide, $Fe_3O_4$ and others. In contrast, an external oxide layer formed on the surface of a steel sheet containing Si and Mn which is once pickled and then annealed in an atmosphere wherein the oxygen partial pressure is controlled as stipulated in the present invention consists of: the above oxide containing Si and Mn by 1 at. % or more in total; and the balance consisting of oxide such as $Fe_3O_4$ containing Mn and Si by less than 1 at. % in total and voids.

(Function of External Oxide Layer)

Figure 2:
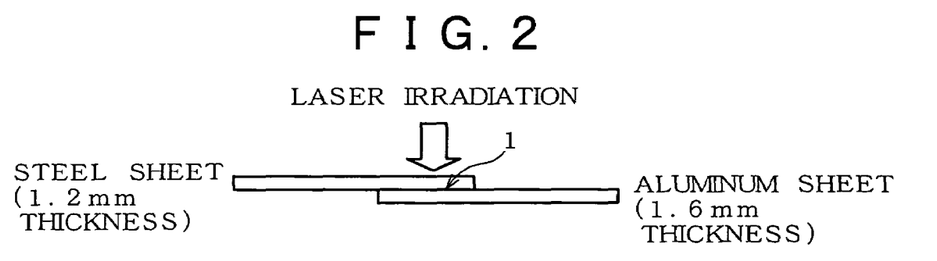
FIG. 2 is an explanatory view showing an embodiment of laser welding for forming a dissimilar materials bonded body.

When steel sheets shown in FIGS. 1A and 1B are weld-bonded to an aluminum material (sheet) as shown in FIG. 2 (an example of lap welding by laser welding is shown), an Al—Fe reaction layer is formed at the bonding face 1 between the steel sheet and the aluminum sheet in the manner of breaking the aforementioned external oxide layer on the surface of the steel sheet regardless of a welding method.

Therefore, although the aforementioned external oxide layer on the surface of a steel sheet has the effect of suppressing the diffusion of Fe and Al during bonding and inhibiting an Al—Fe system brittle intermetallic compound layer (reaction layer) from forming, the substantial effect thereof is limited to the occasion where a phase of oxide, such as $Mn_2SiO_4$, $SiO_2$ or others, containing Si and Mn exists at a prescribed proportion in the aforementioned external oxide layer on the surface of the steel sheet.

For that reason, the present invention stipulates that the proportion of the oxide containing Mn and Si by 1 at. % or more in total in the external oxide layer which exists on the surface of the base steel material of a steel sheet is 50 to 80% in terms of the average proportion of the total length of the oxide to 1 μm length of the interface between the base steel material and the external oxide layer nearly in the horizontal direction. As stated above, by controlling the composition of an external oxide layer, under appropriate welding conditions, the average thickness of a reaction layer at the bonded interface between a steel sheet and an aluminum material is controlled in the optimum range from 0.1 to 10 μm as it well be described later and a high bonding strength can be obtained.

When the proportion is less than 50%, the effect of suppressing the diffusion of Fe and Al during bonding and inhibiting an Al—Fe system brittle intermetallic compound layer (reaction layer) from forming is small. As a result, even under appropriate welding conditions or regardless of welding conditions, a reaction layer is excessively formed, for example, in excess of 10 μm in terms of the average thickness of the reaction layer at the bonded interface between a steel sheet and an aluminum material and thus a high bonding strength cannot be obtained.

On the other hand, when the area percentage exceeds 80%, even under appropriate welding conditions, it is difficult to break an external oxide layer and form a reaction layer and thus the reaction layer is formed insufficiently. As a result, the average thickness of the reaction layer is less than 0.1 μm for example, and metallurgical bonding cannot be obtained.

(Function of Internal Oxide 1)

When a steel sheet is weldbonded to an aluminum sheet as shown in FIG. 2, internal oxide which comprises spherical oxide such as $SiO_2$ and contains Mn and Si by 1% or more in total dissolves into an Al—Fe reaction layer formed by breaking the aforementioned external oxide layer on the surface of the steel sheet, suppresses the diffusion of Fe and Al, and inhibits the reaction layer from excessively forming. The internal oxide includes also grain boundary oxide. The grain boundary oxide is also oxide containing Mn and Si by about 1% or more in total.

In order to exhibit the above effect, it is preferable that the total area percentage of oxide and grain boundary oxide which are internal oxide existing in a steel region up to the depth of 10 μm from the surface of the base steel material of the steel sheet and contain Mn and Si by 1% or more in total is 3% or more to less than 10% in a visual field of 10 $\mu m^2$ of the steel region.

When an area percentage is smaller than 3%, the effect of suppressing the growth of a reaction layer is insufficient, a reaction layer forms excessively, for example in excess of 10 μm in terms of the average thickness of the reaction layer at the bonded interface between a steel sheet and an aluminum material, and a high bonding strength is not obtained.

On the other hand, when an area percentage is 10% or more, a reaction layer rather grows locally and nonuniformly at the bonded interface between a steel sheet and an aluminum material and there is a high possibility that metallurgical bonding cannot be obtained even under appropriate welding conditions.

(Function of Internal Oxide 2)

Further, in the deep inner region of 10 μm or more in depth from the surface of a steel sheet, if oxide containing Mn and Si by 1% or more in total exists abundantly up to the deep interior of the steel sheet, there is a possibility that the diffusion of Al into Fe is too suppressed, the thickness of a reaction layer is obtained insufficiently, a uniform reaction layer is hardly formed, and a high bonding strength is not obtained. The internal oxide includes also grain boundary oxide. The grain boundary oxide is also oxide containing Mn and Si by about 1% or more in total.

For the reason, it is preferable that the total area percentage of the oxide and the grain boundary oxide containing Mn and Si by 1% or more in total is limited to 0.1% or less in the visual field of 10 $\mu m^2$ of the region.

(Measurement Method of Oxide)

In the present invention, oxide is measured with a TEM (transmission electron microscope) of 10,000 to 30,000 magnifications used in combination with EDX (energy dispersive x-ray spectroscopy). That is, external oxide is identified by analyzing an interface between a base steel material and an external oxide layer nearly in the horizontal direction on a sectional plane in the thickness direction of the steel sheet by EDX (energy dispersive x-ray spectroscopy), thereby obtaining the total amount of Mn and Si in the external oxide layer in the vicinity of the interface, and distinguishing the phase of oxide (plural oxides) containing Mn and Si by 1 at. % or more in total in the vicinity of the interface from the other phases. Successively, the length of the oxide phase containing Mn and Si by 1 at. % or more in total nearly in the horizontal direction on the interface is measured with the TEM in the same interface region as the EDX analysis. Then, the proportion of the total length of the oxide phase to 1 μm length of the interface nearly in the horizontal direction is obtained. The measurement is carried out at plural locations and the results are averaged.

Internal oxide is identified by distinguishing the oxide containing Mn and Si by 1 at. % or more in total from the other phases by the EDX at plural locations in the steel region up to the depth of 10 μm from the surface of the base steel material of a steel sheet or the steel region deeper than 10 μm from the surface of the base steel material of the steel sheet. Then, at each of the plural locations, area percentage of the oxide phase containing Mn and Si by 1 at. % or more in total in the visual field of 10 $\mu m^2$ is obtained with a TEM in the same interface region as the EDX analysis. Here, the area of grain boundary oxide is also included in the area of the oxide containing Mn and Si by 1 at. % or more in total. The measurement is carried out at plural locations and the results are averaged.

(Control of Oxide Layer)

The proportion of the oxide containing Mn and Si by 1 at. % or more in total in the external and internal oxide of a steel sheet can be controlled by controlling the annealing condition (oxygen partial pressure) of the steel sheet as stated above.

More specifically, the control is carried out by changing an oxygen partial pressure (a dew point) in an annealing atmosphere of a steel sheet. In any of steel types, when an oxygen partial pressure (a dew point) is high, the amount of oxide wherein Si and Mn concentrate in the external oxide layer increases on the surface of a steel sheet. Further, the interior of the steel is also oxidized, internal oxidation and grain boundary oxidation advance, $SiO_2$, $Mn_2SiO_4$ and others are formed in the steel, and the area percentage of the oxide containing Si and Mn in the steel increases.

In contrast, in any of steel types, when an oxygen partial pressure (a dew point) is low, although oxide such as $Mn_2SiO_4$, $SiO_2$ and others wherein Si and Mn concentrate in the external oxide layer on the surface of a steel sheet is formed, the amount or area percentage thereof decreases. In the meantime, the oxidation of the interior of the steel hardly advances, the amount of $SiO_2$, $Mn_2SiO_4$ and others formed in the interior of the steel decreases, and the area percentage of the oxide containing Si and Mn in the steel lowers.

(Reaction Layer at Bonded Interface of Dissimilar Materials Bonded Body)

In the case of a dissimilar materials bonded body formed by weldbonding a steel sheet wherein the oxide layer on the surface thereof is controlled as stated above to an aluminum material, by adopting appropriate welding conditions, a high bonding strength is obtained. However, there are some cases where a high bonding strength cannot be realized under some welding conditions even when the conditions on the side of a weld material are arranged in conformity with a steel sheet according to an embodiment of the present invention.

For that reason, viewed from the side of a dissimilar materials bonded body, it is necessary to define conditions to secure a high bonding strength and also control and optimize welding conditions so as to conform with conditions on the side of a dissimilar materials bonded body. Therefore, the present invention stipulates the conditions under which a dissimilar materials bonded body can also secure a high bonding strength.

As stated above, viewed from the side of a dissimilar materials bonded body, it is necessary to form an Al—Fe reaction layer having a minimum thickness necessary for metallurgical bonding in as wide a range as possible of the bonded part. That is, firstly it is necessary to control the reaction layer so as to have a minimum thickness necessary for metallurgical bonding and further control the average thickness of the reaction layer at the bonded interface with an aluminum material in the direction of nugget depth (in the thickness direction of a steel sheet) to 0.1 to 10 μm.

At a weldbonded interface between a steel sheet and an aluminum material, without regard to a welding method, a reaction layer has a laminar $Al_5Fe_2$ system compound layer on the side of the steel sheet and a layer wherein granular or acicular $Al_3Fe$ system compound and $Al_{19}Fe_4Si_2Mn$ system compound coexist on the side of the aluminum material.

When the thickness of such a brittle reaction layer in the direction of nugget depth exceeds 10 μm, a bonding strength significantly lowers. On the other hand, when the thickness of a reaction layer in the direction of nugget depth is less than 0.1 μm, metallurgic bonding is insufficient and a sufficient bonding strength is not obtained. For those reasons, the average thickness of a reaction layer at a bonded interface between a steel sheet wherein the oxide layer on the surface thereof is controlled and an aluminum material is limited in the range from 0.1 to 10 μm.

(Range of Reaction Layer Formation)

Next, in the case of a dissimilar materials bonded body, it is necessary to form such an Al—Fe reaction layer as mentioned above in as wide a range as possible at a bonded part. That is, it is preferable that the length of a reaction layer formed after bonded is not less than 50% of the length of weldbonding (nearly in the horizontal direction of a steel sheet, namely in the direction orthogonal to the direction of nugget depth) in the case of linear welding such as laser welding, MIG welding, or the like. Further, it is preferable that the area of a reaction layer formed after bonded is not less than 50% of a bonded area (nearly in the horizontal direction of a steel sheet, namely in the direction orthogonal to the direction of nugget depth) in the case of spot welding including FSW (friction stir welding).

If, on the premise that a reaction layer has a thickness in the appropriate range, the reaction layer of an appropriate thickness range is prevented from forming uniformly in as wide a range as possible, then metallurgical bonding may not surely be attained. In contrast, when the reaction layer of an appropriate thickness range is formed in the range of 50% or more, a sufficient bonding strength is surely obtained.

(Measurement of Reaction Layer at Bonded Interface of Dissimilar Materials Bonded Body)

In the present invention, a reaction layer is, as it will be described later in Examples, measured by cutting the bonded part of a steel sheet and an aluminum material and observing the cross section of the bonded interface with a SEM.

(Welding Method)

Here, in the present invention, as a welding method, adopted may be any of methods including spot welding, laser welding, MIG welding, ultrasonic bonding, diffusion bonding, spot FSW (friction stir welding), friction welding, brazing, and others.

The present invention is hereunder explained concretely with reference to examples. However, the present invention is not limited by the after-mentioned examples and can arbitrarily be modified in the range conforming to the above- and after-mentioned tenor of the present invention, and all the modifications are included in the technological scope of the present invention.

EXAMPLES

Bonding of dissimilar materials was carried out and thus dissimilar materials bonded bodies were produced by spot welding in the case of Example 1, laser welding in the case of Example 2, and MIG welding in the case of Example 3. Then, the bonding strength of each of the dissimilar materials bonded bodies was measured and evaluated.

Example 1

Spot Welding

Steel sheets produced by melting, refining and then rolling to the thickness of 1.2 mm the steels having component compositions shown in Table 1 were once pickled and the existing surface oxidation layers were removed. Thereafter, steel sheets having different oxidation structures were produced by variously changing the oxygen partial pressure (dew point) in an annealing atmosphere under the conditions A, B, C, D, and E shown in Table 2.

The oxidation structures of the steel sheets after annealed are shown in Tables 4 to 7. Here, each oxidation structure at the bonded-equivalent part of each steel sheet was measured by the following relevant measuring method.

(Range of External Oxide Formation)

External oxide was identified by producing a cross-sectional specimen with a focused ion beam processor (FB-2000A made by Hitachi, Ltd.), analyzing an interface between a base steel material and an external oxide layer nearly in the horizontal direction on a sectional plane in the thickness direction of the steel sheet with the aforementioned EDX (type: NORAN-VANTAGE), thereby obtaining the total amount of Mn and Si in the external oxide layer in the vicinity of the interface, and then distinguishing the oxide phase (plural oxides) containing Mn and Si by 1 at. % or more in total in the vicinity of the interface from the other phases.

Successively, the sectional plane was observed with a TEM (field emission transmission electron microscope: JEM-2010F made by JEOL, acceleration voltage: 200 kv) of 100,000 magnifications and the length of the oxide phase containing Mn and Si by 1 at. % or more in total nearly in the horizontal direction on the interface was obtained in the same interface region as the aforementioned EDX analysis. Then, the proportion of the total length of the oxide phase to 1 μm length of the interface nearly in the horizontal direction was obtained. The procedures were applied to three visual fields of each specimen and the average was obtained.

(Area Percentage of Internal Oxide)

Internal oxide was identified by distinguishing oxide containing Mn and Si by 1 at. % or more in total from the other phases with the aforementioned EDX at plural portions in the steel region up to the depth of 10 μm from the surface of the base steel material of a steel sheet or in the steel region exceeding 10 μm in depth from the surface of the base steel material of a steel sheet.

Then, the sectional plane was observed with a TEM (field emission transmission electron microscope: JEM-2010F made by JEOL, acceleration voltage: 200 kv) of 30,000 magnifications and the area percentage of the oxide phase containing Mn and Si by 1 at. % or more in total in a visual field (a base steel area) of 10 μm$^2$ was obtained in the same interface region as the aforementioned EDX analysis. Here, the area of grain boundary oxide was also included in the area of the oxide containing Mn and Si by 1 at. % or more in total. The procedures were applied to three visual fields of each specimen and the average was obtained.

All the steel sheets of the nos. 1 to 4 having the component compositions shown in Table 1 were high-strength steel sheets which the present invention involved and the tensile strengths of the steel sheets were 450 MPa in the case of the steel no. 1, 750 MPa in the case of the steel no. 2, and 990 MPa in the case of the steel no. 3.

In the annealing conditions shown in Table 2, the codes C and D were the annealing conditions where the oxygen partial pressures (dew points) were good. As a result, as shown in Table 2, the external oxide layers and the internal oxide of the steel sheets after annealed satisfied the requirements of the present invention. That is, the proportion of oxide containing Mn and Si by 1 at. % or more in total in the external oxide layer was in the range from 50 to 80% in terms of the average proportion of the total length of the oxide to 1 μm length of the interface between the base steel material and the external oxide layer nearly in the horizontal direction. Further, with regard to internal oxide 1 (existed in a steel region up to 10 μm in depth from the surface of the base steel material of a steel sheet), the proportion of internal oxide containing Mn and Si by 1 at. % or more in total, the internal oxide including grain boundary oxide, was in the range from 3% or more to less than 10% in terms of an average area percentage in a visual field of 10 μm$^2$ in the steel region. Furthermore, with regard to internal oxide 2 (existed in a steel region exceeding 10 μm in depth from the surface of the base steel material of a steel sheet), the proportion of internal oxide containing Mn and Si by 1 at. % or more in total, the internal oxide including grain boundary oxide, was 0.1% or less in terms of an average area percentage in a visual field of 10 μm$^2$ in the steel region.

In contrast, in the annealing conditions shown in Table 2, the codes A and B were the cases where the oxygen partial pressures (dew points) were too low. As a result, the average proportion of the total length of the aforementioned oxide in the external oxide layer of each of the steel sheets after annealed exceeded 80%.

On the contrary, in the case of the code E, the oxygen partial pressure (dew point) was too high. As a result, the average proportion of the total length of the aforementioned oxide in the external oxide layer of the steel sheet after annealed decreased up to less than 50%. Meanwhile, the proportion of the internal oxide and grain boundary oxide became too high and, although the reaction layer grew locally, the growth of the reaction layer was nonuniform and the range of the formation of the reaction layer became narrow.

Steel sheets having various oxidation structures and aluminum materials were cut into a shape of a cross tensile test piece stipulated in JIS A3137. Each of the steel sheets and each of the aluminum materials were overlapped, and then spot-welded under the conditions of the patterns a, b, c, and d shown in Table 3, and thus the bonding of dissimilar materials was carried out.

With regard to the aluminum material, the same one kind of aluminum materials, A6022 (containing S: 1.01% and Mn: 0.07%), having the thicknesses of 1 and 1.6 mm were used for all the dissimilar materials bonding.

With regard to the spot welding, a direct-current resistance welding tester was used and the welding of single spot was carried out under the conditions of the welding current, the welding pressure, and the time shown in Table 3. Dome-type electrodes made of Cu—Cr alloy were used and an aluminum material was placed on the side of the positive electrode and a steel sheet was placed on the side of the negative electrode.

The thickness and the range of the formed interface reaction layer of each of the produced dissimilar materials bonded bodies were measured. The results are shown in Tables 4 to 7.

The thickness of each interface reaction layer was measured by cutting a dissimilar materials bonded body in the center of the spot-welded part, embedding it in resin and polishing it, and then observing it over the whole bonded part at intervals of 0.5 mm with a SEM. The thickness of a reaction layer was measured in a visual field of 2,000 magnifications when the thickness was 1 μm or more and in a visual field of 10,000 magnifications when the thickness was less than 1 μm, then an average thickness was obtained for each spot welding, and the average thickness of thirty spot-welded parts was regarded as the average thickness of the interface reaction layer.

Further, the proportion of the range wherein an interface reaction layer was formed was determined by obtaining the percentage of the area of the formed reaction layer to the whole spot area at each spot-welded part and obtaining the average of thirty spot-welded parts.

Each of the produced dissimilar materials bonded bodies was subjected to a cross tensile test and the peel strength was obtained. The results are also shown in Tables 4 to 7. A peel strength was, in reference to the fact that the bonding strength of spot welding between A6022 aluminum materials was 1.0 kN, evaluated as excellent when the bonding strength was 1.5 kN or more, good when the same was 1.0 to 1.5 kN, fair when the same was 0.5 to 1.0 kN, and poor when the same was less than 0.5 kN.

As it is obvious from Tables 4 to 7, in the cases of the steel sheets of the invention examples which were produced by using the steel sheets having the component compositions of nos. 1 to 4 shown in Table 1 and being processed under the annealing conditions of the codes C and D of the appropriate oxygen partial pressures (dew points) as shown in Table 2, the external oxide layer and internal oxide of each steel sheet after annealed satisfied the requirements of the present invention.

As a result, it was understood that, in any of the cases of the dissimilar materials bonded bodies of the invention examples which were produced by using the steel sheets satisfying the oxide conditions and controlling the welding conditions appropriately, the thickness and range of the formed interface reaction layer of a dissimilar materials bonded body satisfied the requirements of the present invention and the bonding strength of the dissimilar materials bonded body increased.

However, among the invention examples, in the cases of the invention examples nos. 8, 12, 26 and 28 wherein either the thickness or the range of the formed interface reaction layer of each of the dissimilar material bonded bodies was close to the relevant lower limit, spot welding was applied under the welding conditions of the welding pattern b or d of a relatively long weld time (400 msec.) as shown in Table 3. Therefore, in those cases, the bonding strength of each dissimilar materials bonded body lowered in comparison with other invention examples nos. 7, 11, 25 and 27 wherein spot welding was applied under the welding conditions of the welding patterns a and c wherein only the weld time was relatively short (40 msec.) and the other conditions were not changed as shown in Table 3.

Further, in the comparison between an invention example and a comparative example both of which were processed under the same appropriate annealing conditions of the codes C and D, the invention example no. 1 and the comparative example no. 2, the invention example no. 3 and the comparative example no. 4, the invention example no. 5 and the comparative example no. 6, the invention example no. 9 and the comparative example no. 10 (those are shown in Table 4), the invention example no. 17 and the comparative example no. 18, the invention example no. 19 and the comparative example no. 20, the invention example no. 25 and the comparative example no. 26, and the invention example no. 27 and the comparative example no. 28 (those are shown in Table 5) were processed while only the spot welding condition (weld time) was differentiated from each other by applying the patterns a and b shown in Table 3 respectively and the other conditions were identical. Then, only by the difference of the spot weld time, the thickness and range of the formed interface reaction layer and moreover the bonding strength of a dissimilar materials bonded body were largely different from each other between the invention examples and the comparative examples.

From the above facts therefore, the significance of the requirements of the present invention for the thickness and range of the formed interface reaction layer of a dissimilar materials bonded body can be understood. Further, it is understood that, in order to satisfy the requirements of the present invention for the thickness and range of the formed interface reaction layer of a dissimilar materials bonded body and increase the bonding strength of the dissimilar materials bonded body, it is necessary to not only use a steel sheet satisfying the requirements of oxide but also control the welding conditions appropriately.

On the other hand, as it is obvious from Tables 6 and 7, even when the steel sheets having the component compositions of nos. 1 to 4 shown in Table 1 were used, in the cases of the steel sheets of the comparative examples processed under the annealing conditions of the codes A, B and E wherein the oxygen partial pressures (dew points) were inappropriate as shown in Table 2, the external oxide layers and internal oxide of the steel sheets after annealed deviated from the requirements of the present invention.

Then, it was understood that, when steel sheets the oxide conditions of which deviated from the ranges stipulated in the present invention were used, even though appropriate welding conditions were applied in the same way as the invention examples shown in Tables 4 and 5, in the cases of the comparative examples, the thickness and range of the formed interface reaction layer of a dissimilar materials bonded body deviated from the requirements of the present invention and the bonding strength of the dissimilar materials bonded body significantly lowered. In other words, it was understood that, when a steel sheet the oxide conditions of which deviated from the ranges stipulated in the present invention was used, a high bonding strength of the dissimilar materials bonded body could not be obtained without regard to the spot welding conditions and the thickness of an aluminum sheet.

Therefore, the above facts ensure the critical significance of the oxide conditions of a steel sheet for a dissimilar materials bonded body according to an embodiment of the present invention.

TABLE 1

| | Components of steel sheet (mass %, the balance comprises Fe) | | | | | | | | | | |
| --- | --- | --- | --- | --- | --- | --- | --- | --- | --- | --- | --- |
| Number | C | Si | Mn | P | S | Al | Ti | Nb | Cr | Mo | N |
| 1 | 0.06 | 0.23 | 0.55 | 0.01 | 0.01 | 0.043 | 0.07 | 0.051 | 0.06 | 0.02 | 0.0021 |
| 2 | 0.13 | 1.0 | 1.45 | 0.001 | 0.001 | 0.031 | 0.1 | 0.09 | 0.07 | 0.02 | 0.0031 |
| 3 | 0.08 | 1.69 | 1.23 | 0.001 | 0.001 | 0.027 | — | — | 0.2 | 0.1 | 0.0035 |
| 4 | 0.20 | 4.8 | 1.9 | 0.005 | 0.004 | 0.033 | 0.07 | — | — | 0.02 | 0.0021 |

TABLE 2

| | Annealing condition | | | | Steel sheet after annealed | | | |
| --- | --- | --- | --- | --- | --- | --- | --- | --- |
| | | | | | External oxide layer, proportion of length of oxide containing Mn and Si (%) | Internal oxide 1, area percentage of oxide containing Mn and Si (%) | Internal oxide 2, area percentage of oxide containing Mn and Si (%) | |
| Code | Atmosphere composition | Temperature (°C.) | Time (sec.) | Dew point (°C.) | | | | Classification |
| A | $N_2$:97% | 880 | 200 | −80 | 100 | Less than 1% | 0% | Comparative example |
| B | $H_2$:3% | | | −60 | 90 | Not less than 1% to less than 3% | 0.01% | Comparative example |
| C | | | | −40 | 72 | Not less than 3% to less than 5% | 0.05% | Invention example |
| D | | | | −20 | 63 | Not less than 5% to less than 10% | 0.08% | Invention example |
| E | | | | 0 | 47 | Not less than 10% | 5.3% | Comparative example |

\* Internal oxide 1: oxide existing in a steel region up to 10 μm in depth from the surface of the base steel material of a steel sheet
\* Internal oxide 2: oxide existing in a steel region exceeding 10 μm in depth from the surface of the base steel material of a steel sheet

TABLE 3

| | Thickness of aluminum alloy sheet (mm) | | | |
| --- | --- | --- | --- | --- |
| Spot welding condition | 1.0 | 1.0 | 1.6 | 1.6 |
| Welding pressure (kN) | 1.5 | 1.5 | 3.5 | 3.5 |
| Welding current (kA) | 16 | 16 | 30 | 30 |
| Weld time (msec.) | 40 | 400 | 40 | 400 |
| Electrode Positive electrode | Cu—Cr alloy/dome type Aluminum | | | |
| Negative electrode | Steel | | | |
| Welding condition pattern | a | b | c | d |

TABLE 4

| Classification | Number | Dissimilar materials bonding condition | | | Dissimilar materials bonded body | | | Evaluation |
| --- | --- | --- | --- | --- | --- | --- | --- | --- |
| | | Steel type (Table 1) | Annealing condition (Table 2) | Welding condition (Table 3) | Average thickness of reaction layer (μm) | Proportion of formed reaction layer (%) | Peel strength (kN) | |
| Invention example | 1 | 1 | C | a | 3.5 | 59 | 1.14 | good |
| Comparative example | 2 | 1 | C | b | 13.8 | 66 | 0.23 | poor |
| Invention example | 3 | 1 | D | a | 2.3 | 61 | 1.25 | good |
| Comparative example | 4 | 1 | D | b | 12.4 | 55 | 0.65 | poor |
| Invention example | 5 | 1 | C | c | 1.3 | 65 | 1.23 | good |
| Comparative example | 6 | 1 | C | d | 10.9 | 54 | 0.78 | poor |
| Invention example | 7 | 1 | D | c | 2.1 | 79 | 1.32 | good |
| Invention example | 8 | 1 | D | d | 3.5 | 54 | 0.88 | fair |
| Invention example | 9 | 2 | C | a | 2.1 | 67 | 1.34 | good |
| Comparative example | 10 | 2 | C | b | 11.4 | 69 | 0.36 | poor |
| Invention example | 11 | 2 | D | a | 3.9 | 71 | 1.14 | good |
| Invention example | 12 | 2 | D | b | 10.1 | 54 | 0.84 | fair |
| Invention example | 13 | 2 | C | c | 1.7 | 76 | 1.89 | excellent |
| Invention example | 14 | 2 | C | d | 3.5 | 62 | 1.39 | good |
| Invention example | 15 | 2 | D | c | 1.2 | 83 | 1.97 | excellent |
| Invention example | 16 | 2 | D | d | 3.8 | 61 | 1.43 | good |

TABLE 5

(Continued from Table 4)

| | | Dissimilar materials bonding condition | | | Dissimilar materials bonded body | | | |
|---|---|---|---|---|---|---|---|---|
| Classification | Number | Steel type (Table 1) | Annealing condition (Table 2) | Welding condition (Table 3) | Average thickness of reaction layer (μm) | Proportion of formed reaction layer (%) | Peel strength (kN) | Evaluation |
| Invention example | 17 | 3 | C | a | 2.2 | 68 | 1.33 | good |
| Comparative example | 18 | 3 | C | b | 11.2 | 65 | 0.59 | poor |
| Invention example | 19 | 3 | D | a | 1.9 | 60 | 1.38 | good |
| Comparative example | 20 | 3 | D | b | 2.5 | 47 | 0.54 | poor |
| Invention example | 21 | 3 | C | c | 0.89 | 81 | 1.88 | excellent |
| Invention example | 22 | 3 | C | d | 1.8 | 74 | 1.44 | good |
| Invention example | 23 | 3 | D | c | 0.96 | 85 | 1.95 | excellent |
| Invention example | 24 | 3 | D | d | 2.0 | 50 | 1.32 | good |
| Invention example | 25 | 4 | C | a | 0.99 | 59 | 1.29 | good |
| Comparative example | 26 | 4 | C | b | 1.04 | 46 | 0.88 | fair |
| Invention example | 27 | 4 | D | a | 1.13 | 67 | 1.32 | good |
| Comparative example | 28 | 4 | D | b | 1.65 | 46 | 0.84 | fair |
| Invention example | 29 | 4 | C | c | 0.78 | 78 | 1.56 | excellent |
| Invention example | 30 | 4 | C | d | 1.67 | 81 | 1.25 | good |
| Invention example | 31 | 4 | D | c | 1.0 | 89 | 1.66 | excellent |
| Invention example | 32 | 4 | D | d | 1.39 | 74 | 1.38 | good |

TABLE 6

(Continued from Table 5)

| | | Dissimilar materials bonding condition | | | Dissimilar materials bonded body | | | |
|---|---|---|---|---|---|---|---|---|
| Classification | Number | Steel type (Table 1) | Annealing condition (Table 2) | Welding condition (Table 3) | Average thickness of reaction layer (μm) | Proportion of formed reaction layer (%) | Peel strength (kN) | Evaluation |
| Comparative example | 33 | 1 | A | a | 0.01 | 9 | 0.11 | poor |
| Comparative example | 34 | 1 | A | b | 0.03 | 11 | 0.17 | poor |
| Comparative example | 35 | 1 | B | a | 0.09 | 23 | 0.19 | poor |
| Comparative example | 36 | 1 | B | b | 0.08 | 36 | 0.34 | poor |
| Comparative example | 37 | 1 | E | a | 5.9 | 30 | 0.33 | poor |
| Comparative example | 38 | 1 | E | b | 6.8 | 34 | 0.29 | poor |
| Comparative example | 39 | 1 | E | c | 5.0 | 15 | 0.32 | poor |
| Comparative example | 40 | 1 | E | d | 7.8 | 21 | 0.36 | poor |
| Comparative example | 41 | 2 | A | a | 0.02 | 5 | 0.09 | poor |
| Comparative example | 42 | 2 | A | b | 0.06 | 13 | 0.12 | poor |
| Comparative example | 43 | 2 | B | a | 0.04 | 25 | 0.13 | poor |
| Comparative example | 44 | 2 | B | b | 0.09 | 28 | 0.11 | poor |
| Comparative example | 45 | 2 | E | a | 4.6 | 14 | 0.21 | poor |
| Comparative example | 46 | 2 | E | b | 10.6 | 32 | 0.15 | poor |
| Comparative example | 47 | 2 | E | c | 1.3 | 32 | 0.44 | poor |
| Comparative example | 48 | 2 | E | d | 4.5 | 35 | 0.47 | poor |

TABLE 7

(Continued from Table 6)

| | | Dissimilar materials bonding condition | | | Dissimilar materials bonded body | | | |
|---|---|---|---|---|---|---|---|---|
| Classification | Number | Steel type (Table 1) | Annealing condition (Table 2) | Welding condition (Table 3) | Average thickness of reaction layer (μm) | Proportion of formed reaction layer (%) | Peel strength (kN) | Evaluation |
| Comparative example | 49 | 3 | A | a | 0.02 | 1 | 0.10 | poor |
| Comparative example | 50 | 3 | A | b | 0.02 | 3 | 0.14 | poor |
| Comparative example | 51 | 3 | B | a | 0.04 | 6 | 0.13 | poor |

TABLE 7-continued (Continued from Table 6)

|  |  | Dissimilar materials bonding condition | | | Dissimilar materials bonded body | | | |
| --- | --- | --- | --- | --- | --- | --- | --- | --- |
| Classification | Number | Steel type (Table 1) | Annealing condition (Table 2) | Welding condition (Table 3) | Average thickness of reaction layer (μm) | Proportion of formed reaction layer (%) | Peel strength (kN) | Evaluation |
| Comparative example | 52 | 3 | B | b | 0.09 | 10 | 0.19 | poor |
| Comparative example | 53 | 3 | E | a | 4.9 | 9 | 0.20 | poor |
| Comparative example | 54 | 3 | E | b | 10.2 | 20 | 0.35 | poor |
| Comparative example | 55 | 3 | E | c | 3.8 | 21 | 0.25 | poor |
| Comparative example | 56 | 3 | E | d | 11 | 39 | 0.33 | poor |
| Comparative example | 57 | 4 | A | a | 0.01 | 2 | 0.09 | poor |
| Comparative example | 58 | 4 | A | b | 0.03 | 5 | 0.12 | poor |
| Comparative example | 59 | 4 | B | a | 0.02 | 8 | 0.07 | poor |
| Comparative example | 60 | 4 | B | b | 0.08 | 12 | 0.14 | poor |
| Comparative example | 61 | 4 | E | a | 1.91 | 30 | 0.34 | poor |
| Comparative example | 62 | 4 | E | b | 11.2 | 13 | 0.15 | poor |
| Comparative example | 63 | 4 | E | c | 5.8 | 31 | 0.31 | poor |
| Comparative example | 64 | 4 | E | d | 12.7 | 29 | 0.49 | poor |

Example 2

In the same way as Example 1, steel sheets 1.2 mm in thickness having component compositions shown in Table 1 were once pickled and the existing surface oxidation layers were removed. Thereafter, steel sheets having different oxidation structures were produced by variously changing the oxygen partial pressures (dew points) in the annealing atmosphere under the conditions shown in Table 2.

The steel sheets and the same aluminum sheets 1.6 mm in thickness as used in Example 1 were cut into the size of 100 mm×300 mm. An end part of each of the steel sheets was overlapped with an end part of each of the aluminum sheets (overlap width was 30 mm), the overlapped end parts were laser-welded under the arrangement shown in FIG. 2, and thus a dissimilar materials bonded body was produced.

The principal conditions of the laser welding are shown in Tables 8 and 9. With regard to other laser welding conditions, a YAG laser welder having the maximum output of 4.0 kW was used and the side of a steel sheet was irradiated by the laser. Argon was used as the shielding gas.

The thickness and the range of the formed interface reaction layer of each of the produced dissimilar materials bonded bodies were measured. The results are shown in Tables 8 and 9.

The thickness of a reaction layer was obtained by cutting out cross-sectional specimens at intervals of 5 mm over the full bonding length of a lap-welded part and averaging the thicknesses at arbitrary ten portions of the reaction layer. Here, the thickness was measured by the observation with a SEM in a visual field of 2,000 magnifications when the thickness of the reaction layer was 1 μm or more or in a visual field of 10,000 magnifications when the thickness thereof was less than 1 μm.

Further, the proportion of the range of a formed reaction layer was determined by obtaining the proportion of the length of the bonded part wherein the reaction layer was formed to the bonding length of 100 μm in a cross-sectional specimen and averaging the proportions at arbitrary ten portions.

Further, a tensile test piece 30 mm in width was taken from a lap-welded part of a dissimilar materials bonded body and subjected to a tensile test. A bonding strength was evaluated as poor when the breaking load was 1 kN or less, fair when the same was 1 to 3 kN, good when the same was 3 to 5 kN, and excellent when the same exceeded 5 kN. Those results are also shown in Tables 8 and 9.

As it is obvious from Tables 8 and 9, in the cases of the steel sheets of the invention examples which were produced by using the steel sheets having the component compositions of nos. 1 to 4 shown in Table 1 and being processed under the annealing conditions of the codes C and D of appropriate oxygen partial pressures (dew points) as shown in Table 2, the external oxide layer and internal oxide of each steel sheet after annealed satisfied the requirements of the present invention.

As a result, it was understood that, in any of the cases of the dissimilar materials bonded bodies of the invention examples which were produced by using the steel sheets satisfying the oxide conditions and controlling the welding conditions appropriately, by appropriately controlling the welding conditions, the thickness and range of the formed interface reaction layer of a dissimilar materials bonded body satisfied the requirements of the present invention and the bonding strength of the dissimilar materials bonded body increased.

On the other hand, in the cases of the comparative examples using the steel sheets processed under the inappropriate annealing conditions of the codes A, B and E, the surface oxidation structure of each of the steel sheets did not satisfy the requirements of the present invention. As a result, even though the welding conditions were controlled by increasing the laser output, reducing the welding speed, and thus increasing the heat input, the thickness of the reaction layer of a dissimilar materials bonded body was thin and the range of the formed reaction layer was insufficient. Consequently, a high bonding strength was not obtained.

Further, even when the steel sheets which were processed under the annealing conditions of the codes C and D and had the surface oxidation structures thereof in the range stipulated in the present invention were used, in the cases of the comparative examples nos. 70, 72 and 101 processed under the inappropriate welding conditions, the thickness and range of each of the formed reaction layers deviated from the ranges stipulated in the present invention and a high bonding strength was not obtained in comparison with the invention examples nos. 69, 71 and 102 wherein only the laser output and welding speed were different.

From the above facts therefore, the significance of the requirements of the present invention for the thickness and range of the formed interface reaction layer of a dissimilar materials bonded body can be understood. Further, it is understood that, in order to satisfy the requirements of the present invention for the thickness and range of the formed interface reaction layer of a dissimilar materials bonded body and increase the bonding strength of the dissimilar materials bonded body, it is necessary to not only use a steel sheet satisfying the requirement of oxide but also control the welding conditions appropriately. Further, the above facts ensure the critical significance of the oxide conditions of a steel sheet for a dissimilar materials bonded body according to an embodiment of the present invention.

TABLE 8

| | | | Dissimilar materials bonding condition | | | Dissimilar materials bonded body | | | |
|---|---|---|---|---|---|---|---|---|---|
| Classification | Number | Steel type (Table 1) | Annealing condition (Table 2) | Welding condition: laser output (kW) | Welding condition: welding speed (m/min) | Average thickness of reaction layer (μm) | Proportion of formed reaction layer (%) | Breaking load (kN) | Evaluation |
| Comparative example | 65 | 1 | A | 2.0 | 0.30 | 0.04 | 34 | 0.32 | poor |
| Comparative example | 66 | 1 | A | 3.0 | 0.10 | 0.18 | 41 | 0.45 | poor |
| Comparative example | 67 | 1 | B | 2.0 | 0.30 | 0.09 | 43 | 0.64 | poor |
| Comparative example | 68 | 1 | B | 3.0 | 0.10 | 0.59 | 45 | 0.98 | poor |
| Invention example | 69 | 1 | C | 2.0 | 0.30 | 4.1 | 54 | 3.21 | good |
| Comparative example | 70 | 1 | C | 3.0 | 0.10 | 14.5 | 59 | 1.15 | poor |
| Invention example | 71 | 1 | D | 2.0 | 0.30 | 3.9 | 57 | 3.08 | good |
| Comparative example | 72 | 1 | D | 3.0 | 0.10 | 13.3 | 57 | 1.33 | poor |
| Comparative example | 73 | 1 | E | 2.0 | 0.30 | 8.4 | 44 | 0.77 | poor |
| Comparative example | 74 | 1 | E | 3.0 | 0.10 | 12.7 | 23 | 0.65 | poor |
| Comparative example | 75 | 2 | A | 2.0 | 0.30 | 0.09 | 28 | 0.22 | poor |
| Comparative example | 76 | 2 | A | 3.0 | 0.10 | 0.18 | 33 | 0.28 | poor |
| Comparative example | 77 | 2 | B | 2.0 | 0.30 | 0.14 | 25 | 0.21 | poor |
| Comparative example | 78 | 2 | B | 3.0 | 0.10 | 0.23 | 29 | 0.33 | poor |
| Invention example | 79 | 2 | C | 2.0 | 0.30 | 2.98 | 55 | 3.78 | good |
| Invention example | 80 | 2 | C | 3.0 | 0.10 | 3.89 | 78 | 6.98 | excellent |
| Invention example | 81 | 2 | D | 2.0 | 0.30 | 1.63 | 65 | 4.72 | good |
| Invention example | 82 | 2 | D | 3.0 | 0.10 | 1.90 | 73 | 6.54 | excellent |
| Comparative example | 83 | 2 | E | 2.0 | 0.30 | 8.6 | 12 | 0.29 | poor |
| Comparative example | 84 | 2 | E | 3.0 | 0.10 | 14.5 | 9 | 0.11 | poor |

TABLE 9

(Continued from Table 8)

| | | | Dissimilar materials bonding condition | | | Dissimilar materials bonded body | | | |
|---|---|---|---|---|---|---|---|---|---|
| Classification | Number | Steel type (Table 1) | Annealing condition (Table 2) | Welding condition: laser output (kW) | Welding condition: welding speed (m/min) | Average thickness of reaction layer (μm) | Proportion of formed reaction layer (%) | Breaking load (kN) | Evaluation |
| Comparative example | 85 | 3 | A | 2.0 | 0.30 | 0.04 | 19 | 0.28 | poor |
| Comparative example | 86 | 3 | A | 3.0 | 0.10 | 0.18 | 15 | 0.35 | poor |
| Comparative example | 87 | 3 | B | 2.0 | 0.30 | 0.02 | 11 | 0.43 | poor |
| Comparative example | 88 | 3 | B | 3.0 | 0.10 | 0.34 | 13 | 0.59 | poor |
| Invention example | 89 | 3 | C | 2.0 | 0.30 | 0.88 | 53 | 3.24 | good |
| Invention example | 90 | 3 | C | 3.0 | 0.10 | 1.39 | 76 | 5.88 | excellent |
| Invention example | 91 | 3 | D | 2.0 | 0.30 | 0.95 | 64 | 3.09 | good |
| Invention example | 92 | 3 | D | 3.0 | 0.10 | 1.56 | 82 | 6.19 | excellent |
| Comparative example | 93 | 3 | E | 2.0 | 0.30 | 2.1 | 18 | 0.18 | poor |
| Comparative example | 94 | 3 | E | 3.0 | 0.10 | 4.6 | 24 | 0.33 | poor |
| Comparative example | 95 | 4 | A | 2.0 | 0.30 | 0.01 | 9 | 0.12 | poor |
| Comparative example | 96 | 4 | A | 3.0 | 0.10 | 0.04 | 15 | 0.29 | poor |
| Comparative example | 97 | 4 | B | 2.0 | 0.30 | 0.05 | 3 | 0.24 | poor |
| Comparative example | 98 | 4 | B | 3.0 | 0.10 | 0.08 | 8 | 0.33 | poor |
| Invention example | 99 | 4 | C | 2.0 | 0.30 | 0.13 | 56 | 3.18 | good |
| Invention example | 100 | 4 | C | 3.0 | 0.10 | 1.20 | 89 | 6.55 | excellent |
| Comparative example | 101 | 4 | D | 2.0 | 0.30 | 0.35 | 23 | 1.77 | poor |
| Invention example | 102 | 4 | D | 3.0 | 0.10 | 0.86 | 52 | 3.25 | good |
| Comparative example | 103 | 4 | E | 2.0 | 0.30 | 0.56 | 23 | 0.18 | poor |
| Comparative example | 104 | 4 | E | 3.0 | 0.10 | 0.78 | 20 | 0.11 | poor |

Example 3

In the same way as Example 1, steel sheets 1.2 mm in thickness having component compositions shown in Table 1 were once pickled and the existing surface oxidation layers were removed. Thereafter, steel sheets having different oxidation structures were produced by variously changing the oxygen partial pressures (dew points) in the annealing atmosphere under the conditions shown in Table 2.

Figure 3:
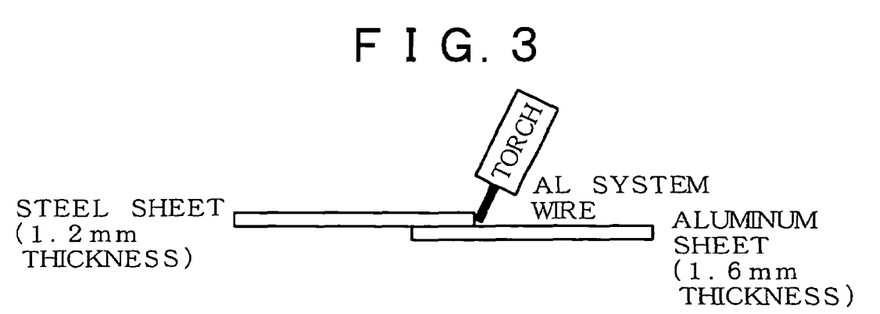
FIG. 3 is an explanatory view showing an embodiment of MIG brazing for forming a dissimilar materials bonded body.

The steel sheets and the same aluminum sheets 1.6 mm in thickness as used in Example 1 were cut into the size of 100 mm×300 mm. An end part of each of the steel sheets was overlapped with an end part of each of the aluminum sheets as shown in FIG. 3 and subjected to MIG brazing to form a lap fillet welded joint (overlap width was 15 mm). The MIG brazing was carried out with an AC power supply.

The wires used were Al type wires as shown in Tables 10 and 11 and those were A4043-WY, A4047-WY, A5356-WY, and A5183-WY stipulated in JIS, for example.

The thickness and the range of the formed interface reaction layer of each of the produced dissimilar materials bonded bodies were measured in the same way as Example 2. The results are shown in Tables 10 and 11.

A tensile test piece 30 mm in width was taken from a lap-welded part and subjected to a tensile test. A bonding strength was evaluated as poor when the breaking load was less than 1 kN, fair when the same was 1 to 3 kN, good when the same was 3 to 5 kN, and excellent when the same exceeded 5 kN. Those results are also shown in Tables 10 and 11.

As it is obvious from Tables 10 and 11, in the cases of the steel sheets of the invention examples which were produced by using the steel sheets having the component compositions of nos. 1 to 4 shown in Table 1 and being processed under the annealing conditions of the codes C and D of appropriate oxygen partial pressures (dew points) as shown in Table 2, the external oxide layer and internal oxide of each steel sheet after annealed satisfied the requirements of the present invention.

As a result, it was understood that, in any of the cases of the dissimilar materials bonded bodies of the invention examples which were produced by using the steel sheets satisfying the oxide conditions and controlling the welding conditions appropriately, by appropriately controlling the welding conditions, the thickness and range of the formed interface reaction layer of a dissimilar materials bonded body satisfied the requirements of the present invention and the bonding strength of the dissimilar materials bonded body increased.

On the other hand, in any of the cases of the comparative examples using the steel sheets processed under the inappropriate annealing conditions of the codes A, B and E, the surface oxidation structure of a steel sheet did not satisfy the requirements of the present invention. As a result, even though the welding conditions of the MIG brazing were optimally controlled by decreasing the welding speed and thus increasing the heat input in the same way as the invention examples, the thickness of the reaction layer of a dissimilar materials bonded body was thin and the range of the formed reaction layer was narrow and insufficient. Consequently, a high bonding strength was not obtained.

Further, even when the steel sheets which were processed under the annealing conditions of the codes C and D and had the surface oxidation structures thereof in the range stipulated in the present invention were used, in the cases of the comparative examples nos. 109 and 111 processed at relatively low welding speed and under inappropriate welding conditions, the thickness and range of each of the formed reaction layers deviated from the ranges stipulated in the present invention and a high bonding strength was not obtained in comparison with the invention examples nos. 110 and 111 wherein only the laser output and welding speed were different.

From the above facts therefore, the significance of the requirements of the present invention for the thickness and range of the formed interface reaction layer of a dissimilar materials bonded body can be understood. Further, it is understood that, in order to satisfy the requirements of the present invention for the thickness and range of the formed interface reaction layer of a dissimilar materials bonded body and increase the bonding strength of the dissimilar materials bonded body, it is necessary to not only use a steel sheet satisfying the requirement of oxide but also control the welding conditions appropriately. Further, the above facts ensure the critical significance of the oxide conditions of a steel sheet for a dissimilar materials bonded body according to an embodiment of the present invention.

TABLE 10

| | | Dissimilar materials bonding condition | | | | | Dissimilar materials bonded body | | | |
|---|---|---|---|---|---|---|---|---|---|---|
| Classification | Number | Steel type (Table 1) | Annealing condition (Table 2) | Welding condition: wire | Welding condition: current A/ voltage V | Welding condition: welding speed (m/min) | Average thickness of reaction layer (μm) | Proportion of formed reaction layer (%) | Breaking load (kN) | Evaluation |
| Comparative example | 105 | 1 | A | A4043 | 60/20 | 0.3 | 0.03 | 10 | 0.22 | poor |
| Comparative example | 106 | 1 | A | A4043 | 60/20 | 0.5 | 0.01 | 4 | 0.13 | poor |
| Comparative example | 107 | 1 | B | A4047 | 60/20 | 0.3 | 0.02 | 8 | 0.28 | poor |
| Comparative example | 108 | 1 | B | A4047 | 60/20 | 0.5 | 0.01 | 5 | 0.30 | poor |
| Comparative example | 109 | 1 | C | A4043 | 60/20 | 0.3 | 15.4 | 35 | 1.56 | poor |
| Invention example | 110 | 1 | C | A4043 | 60/20 | 0.5 | 4.9 | 52 | 3.54 | good |
| Comparative example | 111 | 1 | D | A5356 | 60/20 | 0.3 | 15.7 | 28 | 1.44 | poor |
| Invention example | 112 | 1 | D | A5356 | 60/20 | 0.5 | 4.4 | 53 | 3.24 | good |
| Comparative example | 113 | 1 | E | A5183 | 60/20 | 0.3 | 10.8 | 51 | 0.18 | poor |
| Comparative example | 114 | 1 | E | A5183 | 60/20 | 0.5 | 3.6 | 11 | 0.08 | poor |
| Comparative example | 115 | 2 | A | A5356 | 60/20 | 0.3 | 0.06 | 8 | 0.10 | poor |
| Comparative example | 116 | 2 | A | A5356 | 60/20 | 0.5 | 0.02 | 3 | 0.09 | poor |
| Comparative example | 117 | 2 | B | A4043 | 60/20 | 0.3 | 0.09 | 5 | 0.19 | poor |
| Comparative example | 118 | 2 | B | A4043 | 60/20 | 0.5 | 0.05 | 4 | 0.13 | poor |
| Invention example | 119 | 2 | C | A4047 | 60/20 | 0.3 | 4.8 | 57 | 4.31 | good |
| Invention example | 120 | 2 | C | A4047 | 60/20 | 0.5 | 2.1 | 85 | 6.78 | excellent |

TABLE 10-continued

| Classification | Number | Steel type (Table 1) | Annealing condition (Table 2) | Welding condition: wire | Welding condition: current A/ voltage V | Welding condition: welding speed (m/min) | Average thickness of reaction layer (μm) | Proportion of formed reaction layer (%) | Breaking load (kN) | Evaluation |
|---|---|---|---|---|---|---|---|---|---|---|
| Invention example | 121 | 2 | D | A4043 | 60/20 | 0.3 | 3.5 | 59 | 4.99 | good |
| Invention example | 122 | 2 | D | A4043 | 60/20 | 0.5 | 1.9 | 67 | 7.01 | excellent |
| Comparative example | 123 | 2 | E | A5356 | 60/20 | 0.3 | 10.6 | 52 | 0.17 | poor |
| Comparative example | 124 | 2 | E | A5356 | 60/20 | 0.5 | 5.3 | 24 | 0.08 | poor |

TABLE 11

(Continued from Table 10)

| Classification | Number | Steel type (Table 1) | Annealing condition (Table 2) | Welding condition: wire | Welding condition: current A/ voltage V | Welding condition: welding speed (m/min) | Average thickness of reaction layer (μm) | Proportion of formed reaction layer (%) | Breaking load (kN) | Evaluation |
|---|---|---|---|---|---|---|---|---|---|---|
| Comparative example | 125 | 3 | A | A4043 | 60/20 | 0.3 | 0.05 | 2 | 0.09 | poor |
| Comparative example | 126 | 3 | A | A4043 | 60/20 | 0.5 | 0.04 | 3 | 0.08 | poor |
| Comparative example | 127 | 3 | B | A5356 | 60/20 | 0.3 | 0.04 | 5 | 0.12 | poor |
| Comparative example | 128 | 3 | B | A5356 | 60/20 | 0.5 | 0.02 | 6 | 0.13 | poor |
| Invention example | 129 | 3 | C | A5183 | 60/20 | 0.3 | 0.65 | 56 | 4.15 | good |
| Invention example | 130 | 3 | C | A5183 | 60/20 | 0.5 | 1.29 | 86 | 7.26 | excellent |
| Invention example | 131 | 3 | D | A4043 | 60/20 | 0.3 | 1.44 | 78 | 5.39 | good |
| Invention example | 132 | 3 | D | A4043 | 60/20 | 0.5 | 0.97 | 90 | 7.88 | excellent |
| Comparative example | 133 | 3 | E | A5356 | 60/20 | 0.3 | 0.09 | 53 | 0.37 | poor |
| Comparative example | 134 | 3 | E | A5356 | 60/20 | 0.5 | 1.47 | 45 | 0.46 | poor |
| Comparative example | 135 | 4 | A | A5356 | 60/20 | 0.3 | 0.04 | 1 | 0.01 | poor |
| Comparative example | 136 | 4 | A | A5356 | 60/20 | 0.5 | 0.02 | 4 | 0.03 | poor |
| Comparative example | 137 | 4 | B | A4043 | 60/20 | 0.3 | 0.06 | 3 | 0.02 | poor |
| Comparative example | 138 | 4 | B | A4043 | 60/20 | 0.5 | 0.01 | 4 | 0.03 | poor |
| Invention example | 139 | 4 | C | A5183 | 60/20 | 0.3 | 0.96 | 54 | 3.24 | good |
| Invention example | 140 | 4 | C | A5183 | 60/20 | 0.5 | 1.05 | 65 | 5.66 | excellent |
| Invention example | 141 | 4 | D | A4047 | 60/20 | 0.3 | 0.78 | 51 | 3.45 | good |
| Invention example | 142 | 4 | D | A4047 | 60/20 | 0.5 | 1.12 | 57 | 5.04 | excellent |
| Comparative example | 143 | 4 | E | A5183 | 60/20 | 0.3 | 0.06 | 59 | 0.45 | poor |
| Comparative example | 144 | 4 | E | A5183 | 60/20 | 0.5 | 0.18 | 41 | 0.38 | poor |

The foregoing invention has been described in terms of preferred embodiments. However, those skilled in the art will recognize that many variations of such embodiments exist. Such variations are intended to be within the scope of the present invention and the appended claims.

What is claimed is:

1. A steel sheet for dissimilar materials weldbonding to an aluminum material, said steel sheet containing, in mass, C: 0.02 to 0.3%, Si: 0.2 to 5.0%, Mn: 0.2 to 2.0%, and Al: 0.002 to 0.1%, further one or more of Ti: 0.005 to 0.10%, Nb: 0.005 to 0.10%, Cr: 0.05 to 1.0%, and Mo: 0.01 to 1.0%, and the balance consisting of Fe and unavoidable impurities, wherein the proportion of the oxide containing Mn and Si by 1 at. % or more in total in the external oxide layer which is newly formed after an original oxide layer having already existed on the surface of said steel sheet is once removed and now exists on the surface of the base steel material of said steel sheet is 50 to 80% in terms of the average proportion of the total length of said oxide to 1 μm length of the interface between said base steel material and said external oxide layer nearly in the horizontal direction.

2. The steel sheet for dissimilar materials weldbonding to an aluminum material according to claim 1, wherein the proportion of the internal oxide, including oxide at a grain boundary, which exists in the steel region up to the depth of 10 μm from the surface of said base steel material of said steel sheet and contains Mn and Si by 1 at. % or more in total is 3% or more to less than 10% in terms of the average area percentage of said internal oxide in the visual field of 10 μm² of said steel region.

3. The steel sheet for dissimilar materials weldbonding to an aluminum material according to claim 1, wherein
    the proportion of the internal oxide, including oxide at a grain boundary, which exists in the steel region exceeding 10 μm in depth from the surface of said base steel material of said steel sheet and contains Mn and Si by 1 at. % or more in total is 0.1% or less in terms of the average area percentage of said internal oxide in the visual field of 10 μm² of said steel region.

4. The steel sheet for dissimilar materials weldbonding to an aluminum material according to claim 1, wherein after the original oxide layer has been once removed by subjecting the steel sheet to pickling, said steel sheet is, annealed in an atmosphere wherein the oxygen partial pressure is controlled.

5. The dissimilar materials bonded body formed by weldbonding a steel sheet according to claim 1 to an aluminum material, wherein the weldbonding forms a weld nugget, and having an average thickness, in the direction of the weld nugget depth, of the reaction layer at the bonded interface between said steel sheet and said aluminum material is 0.1 to 10 μm and the range wherein said reaction layer is formed is 50% or more in terms of the bonding length in the case of linear welding or in terms of the bonding area in the case of spot welding.

6. A steel sheet, comprising:
from 0.02 to 0.3 mass % C;
from 0.2 to 5.0 mass % of Si;
from 0.2 to 2.0 mass % of Mn;
from 0.002 to 0.1% of Al; and
one or more selected from the group consisting of Ti in an amount of from 0.005 to 0.10 mass %, Nb in an amount of from 0.005 to 0.10 mass %, Cr in an amount of from 0.05 to 1.0 mass %, and Mo in an amount of from 0.01 to 1.0 mass %;
wherein the balance in mass % comprises Fe and unavoidable impurities;
wherein mass % is based on the total mass of the steel sheet;
wherein the outer surface of the steel sheet is an external oxide layer and the external oxide layer is in direct and continuous contact with an internal oxide layer beneath the external oxide layer;
wherein the external oxide layer comprises an oxide phase comprising one or more external oxides wherein the external oxides comprise at least one of Mn and Si in an amount of 1 at. % or more;
wherein the oxide phase is from 50 to 80% of the length of a 1 μm length of the external oxide layer; and
wherein the steel sheet is obtained by removing an original oxide layer and then forming the external oxide layer in a controlled atmosphere comprising an amount of oxygen that is lower than the amount of oxygen present in an original atmosphere in which the original oxide layer was formed.

7. The steel sheet of claim 6, wherein the internal oxide layer comprises an internal oxide comprising Mn and Si in an amount of 1 at. % or more;
wherein the internal oxide is present in the internal oxide layer at a depth up to 10 μm wherein the depth is measured from the interface between the external oxide layer and the internal oxide layer;
wherein the internal oxide is present in an amount of from 3% to 10% of the average area percentage of the internal oxide measured in a 10 μm² area of the steel sheet; and
wherein the internal oxide includes a grain boundary oxide.

8. The steel sheet of claim 6, wherein the internal oxide is present in an amount of 0.1% or less based on an average area percentage, in the internal oxide layer at a depth of greater than 10 μm;
wherein the internal oxide is present in the internal oxide layer at a depth up to 10 μm wherein the depth is measured from the interface between the external oxide layer and the internal oxide layer;
wherein the internal oxide is present in an amount of from 3% to 10% of the average area percentage of the internal oxide measured in a 10 μm area of the steel sheet; and
wherein the internal oxide includes a grain boundary oxide.

9. The steel sheet of claim 6, wherein the original oxide layer is removed by pickling to form a steel layer and the steel layer is annealed in the controlled atmosphere comprising oxygen, wherein the partial pressure of the oxygen in the controlled atmosphere is controlled to an amount less than the amount of oxygen present in the original atmosphere in which the original oxide layer was formed.

10. A bonded body, comprising:
the steel sheet according to claim 6 and an aluminum material welded to the steel sheet;
wherein the average thickness, in the direction of a nugget depth, of the reaction layer at the bonded interface between the steel sheet and the aluminum material is from 0.1 to 10 μm and the range wherein said reaction layer is formed is 50% or more in terms of the bonding length when the aluminum material is linear welded to the steel sheet or in terms of the bonding area when the aluminum material is spot welded to the steel sheet.

11. The steel sheet of claim 6, wherein the external oxide of the oxide phase comprises at least one selected from the group consisting of $Mn_2SiO_4$ and $SiO_2$.

12. The steel sheet of claim 11, wherein the steel sheet further comprises $Fe_3O_4$.

13. The steel sheet of claim 6, wherein the balance consists of $Fe_3O_4$ and unavoidable impurities.

14. The steel sheet of claim 6, wherein the oxide phase extends from 72 to 80% across a 1 μm length of the external oxide layer.

15. The steel sheet of claim 6, wherein the oxide phase extends from 50 to 63% of a 1 μm length of the external oxide layer.

16. The steel sheet of claim 6, wherein the oxide phase extends from 63 to 72% of a 1 μm length of the external oxide layer.

17. The steel sheet of claim 16, wherein the internal oxide is present in an amount of from 0.05 to 0.08 area %.

18. The steel sheet of claim 16, wherein the internal oxide is present in an amount of from 5% to 10 area %.

19. The steel sheet of claim 16, wherein the internal oxide is present in an amount of from 5 to 10 area %.

20. The steel sheet of claim 9, wherein the atmosphere comprises nitrogen and hydrogen.

* * * * *